H. N. BINGHAM.
TRACTION DRIVE.
APPLICATION FILED JUNE 26, 1919.

1,375,273.

Patented Apr. 19, 1921.

Inventor
H. N. Bingham
By
atty's

UNITED STATES PATENT OFFICE.

HARVEY NELSON BINGHAM, OF WEYBURN, SASKATCHEWAN, CANADA.

TRACTION-DRIVE.

1,375,273.

Specification of Letters Patent. Patented Apr. 19, 1921.

Application filed June 26, 1919. Serial No. 306,987.

*To all whom it may concern:*

Be it known that I, HARVEY NELSON BINGHAM, of the town of Weyburn, in the Province of Saskatchewan, Canada, have invented certain new and useful Improvements in Traction-Drives, of which the following is the specification.

The invention relates to improvements in traction drives and particularly to a drive of the continuous tread type and the principal object of the invention is to provide a traction drive of the above type wherein the load is suspended from the upper side of a continuous track instead of on the road side as ordinarily occurs.

A further object is to provide an easy riding traction drive wherein the jarring incident to traveling is reduced to a minimum, such being an outcome of the top suspension of the load and further to provide a form of drive which will permit of a comparatively high speed of travel.

A further object of the invention is to provide a traction drive having no parts traveling on the roadside thereof so that it is free to yield under working conditions upon engagement with road obstructions.

A further object is to arrange the construction of the traction drive such that the parts traveling on the tread and suspending the load have at all times a smooth running track to operate on.

With the above more important and other minor objects in view which will become more apparent as the description proceeds, the invention consists essentially in the arrangement and construction of parts hereinafter more particularly described and later pointed out in the appended claims, reference being had to the accompanying drawings in which:—

In the drawings like characters of reference indicate corresponding parts in the several figures.

Figure 2:
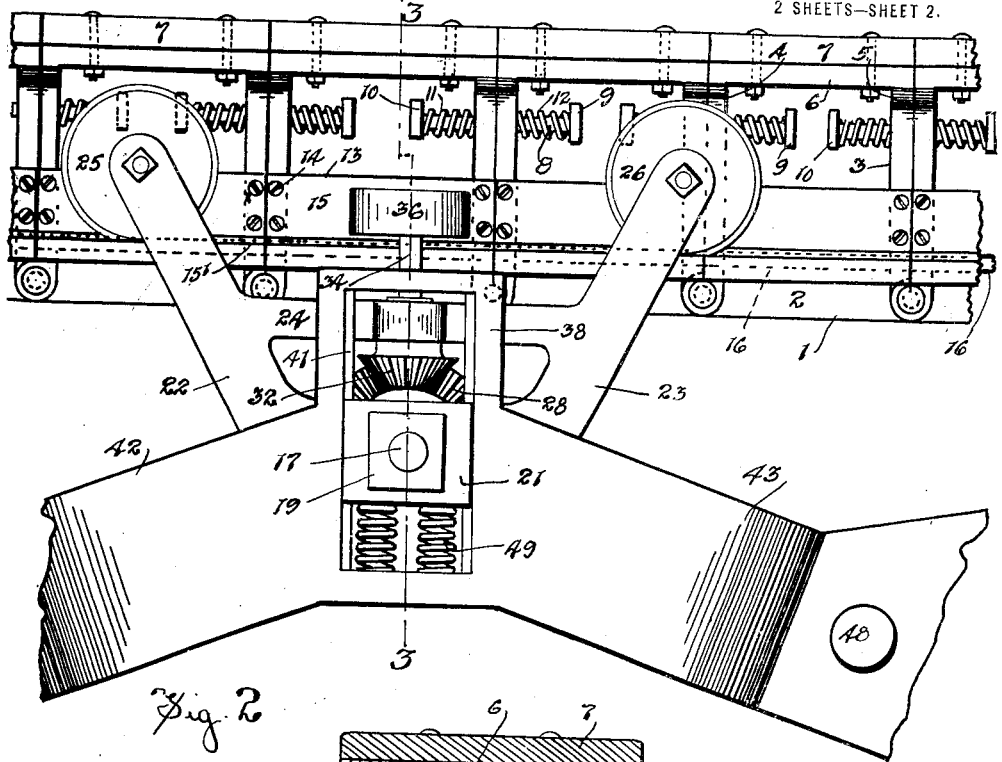
Fig. 2 represents an enlarged detailed side view of a portion of the drive.

The tread of the appliance is in the nature of an endless chain 1 formed from pivotally connected links 2, each link being fitted with what might be termed a tread section 3. The tread sections present end legs 4 and 5 connected by a tread face 6 on which I apply a removable resilient riding strip 7. Through the adjoining legs of the tread sections I pass bolts 8 fitted with end heads 9 and 10 and on the bolts I locate compression springs 11 and 12 which have their outer ends engaged with the heads and their inner ends bearing on the legs. These bolts have a natural tendency to draw and hold the leg sections together as best shown in Fig. 2 and to resist the spreading of the sections when they are making the turn as later described.

Each tread section is provided at the opposite sides with track sections 13, the track sections being suitably fastened as by screws 14 to the bases of the legs.

Figure 3:
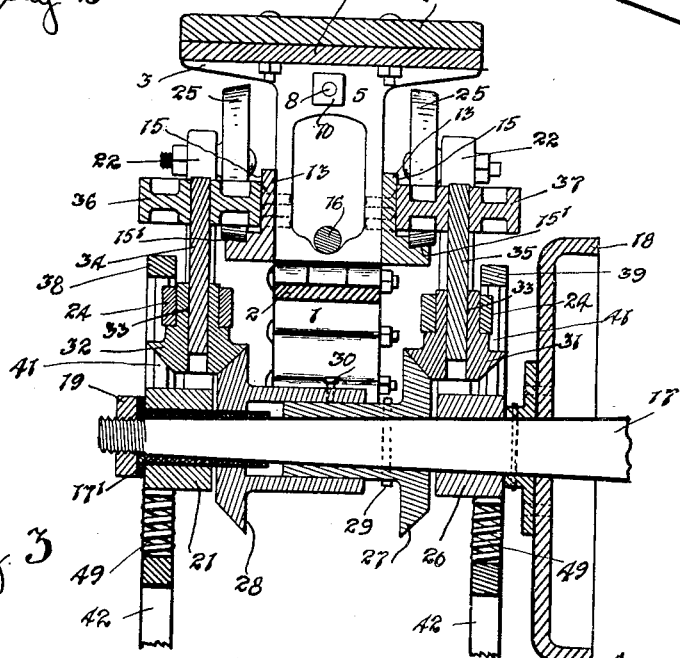
Fig. 3 represents a vertical sectional view through a portion of the drive, the section being taken in the plane denoted by the line 3—3 Fig. 2.

Each track section is more or less of an L-shape in cross section (see Fig. 3) and presents a vertical riding surface 15 and a horizontally disposed riding surface 15′, the surface 15′ being slightly tapered to prevent the lateral slipping of the wheel riding thereon as later described. Actually the track sections provide two track riding surfaces for vertical and horizontal wheels shortly described.

16 represents a continuous cable passing around the top sides of the links and suitably connected thereto.

The above parts constitute what might be termed the tread of my traction drive and here I might explain that the action of the springs would be to draw the tread into a circular form if the same were free, that is to say, unloaded. This is mentioned simply to give a clear idea of the formation of the tread and the action of the springs.

The load, such as the body of a vehicle, is suspended according to my invention from the top side of the tread and not from the bottom or road side as customarily occurs. The driving arrangement and means for suspending the load from the tread will now be described in detail.

17 represents a driving axle such as the rear axle of an automobile truck, 18 the customary brake drum secured to the axle and 19 the fastening nut applied on the end of the axle.

On the axle I mount a pair of inner and outer blocks 20 and 21 each formed as a part of a pair of upwardly diverging hangers 22 and 23, the hangers being connected by a cross brace 24 and being provided at their upper ends with carriage wheels 25 and 26 which have their faces coned and are designed to ride continuously on the tracks 15' at opposite sides of the tread.

On the axle 17 between the blocks I mount two oppositely disposed bevel gears 27 and 28 each of which is provided with an extending sleeve, the sleeve of the gear 27 being permanently fastened to the axle by a pin 29 while the sleeve of the gear 28 is adjustably secured by a set screw 30 to the sleeve of the gear 27. I have made the gear 28 adjustable in and out in this manner so that I can adjust the parts driven thereby in respect to the tread track and as the axle is a tapering one I have introduced a filling material 17' between the axle and the block 21 and the gear 28.

31 and 32 represent a pair of inner and outer bevel pinions rotatably mounted in bearings provided in the cross braces 24, which pinions are continuously in mesh with the gears 27 and 28 and are provided with square central openings 33 receiving vertically disposed driving spindles 34 and 35, the upper ends of which are provided with horizontally disposed driving wheels 36 and 37 riding the tracks 15.

According to this arrangement it will be apparent that in the rotation of the axle the gears 27 and 28 operate the pinions and cause the driving wheels 36 and 37 to turn and in so doing effect, by frictional contact, the turning of the tread.

From the above disclosure it will be apparent that the load on the axle is transmitted directly through the blocks and hangers 22 and 23 to the horizontal track while the drive is effected through the vertically disposed track. The load, being suspended from the tracks 15' in this way, causes the tread, which unloaded has the natural tendency to take the circular form as herein before stated, to collapse so to speak into the form shown in Fig. 1 where it will be seen that at the top and bottom the adjacent tread sections are butted together while at the ends they are spread apart, the spreading action being resisted by the springs. Accordingly the load is suspended at all times on a smooth running track which is entirely clear of the ground and that part of the tread riding the ground is entirely free of any riding parts.

Figure 4:
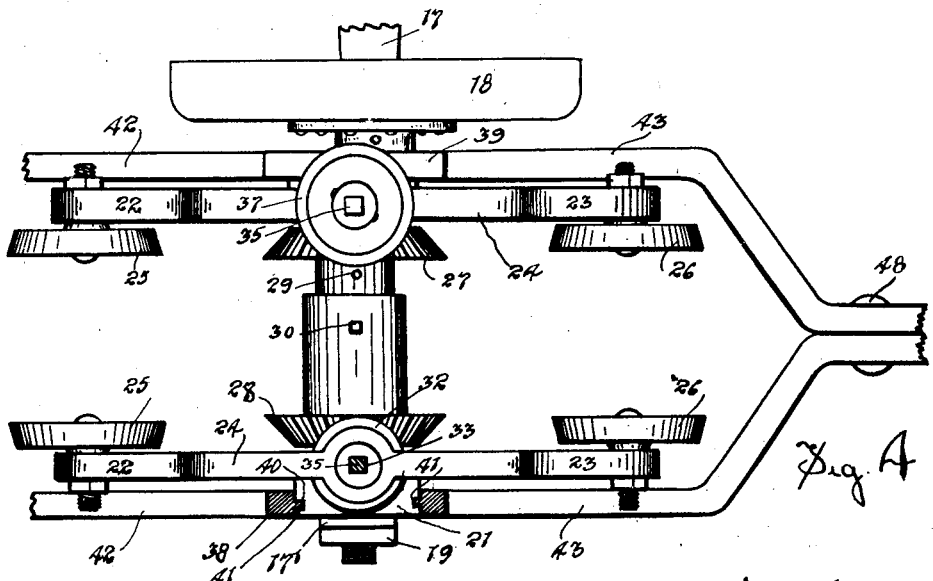
Fig. 4 represents a plan view of the driving parts, the tread and track sections having been removed.

38 and 39 represent a pair of vertically disposed guides receiving the blocks 20 and 21 slidably, the blocks being fitted with grooves 40 which receive tongues 41 extending from the guides. Each guide is formed integral with forward and rear extensions 42 and 43 and the front and rear extensions terminate in each instance in pairs of upper and lower arms 44 and 45 and the extreme ends of the arms carrying rollers 46 and 47 which ride on the inner face of the chain. Here it is to be noticed that the extensions are brought together as best shown in Fig. 4 and that the upper and lower arms are riveted together as indicated at 48. Cushioning springs 49 are inserted between the blocks 20 and 21 and the lower ends of the guides.

Figure 1:
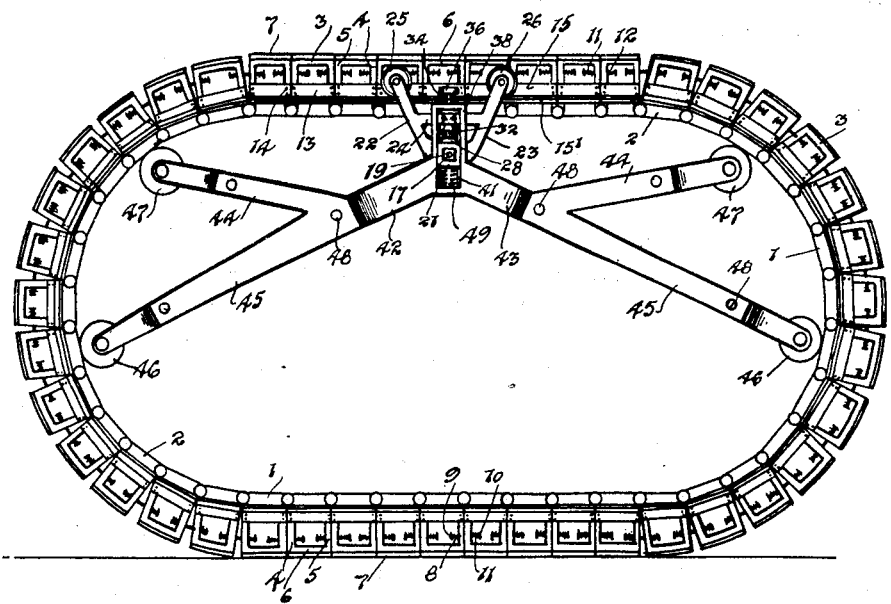
Figure 1 represents a side view of the complete traction drive.

In actual practice two of these traction drives will be utilized, one at each end of the axle which supports the load and obviously the weight of the load has a natural tendency to pull down the tread until the ends of the tread sections 3 on the top and bottom sides butt together and to effect the spreading of the end tread sections as shown in Fig. 1, the spreading action being counteracted by the springs, which are of such a strength, relative to the load, that they prevent collapse.

It is here to be noticed that the load is at all times riding, so to speak, on a smooth track as are the driving wheels, with the result that the wear and tear on the working parts is reduced to a minimum and the load rides evenly and easy and a comparatively high speed can be attained. Further, owing to the fact that the under side of the tread is entirely clear of moving parts it is free to accommodate itself to the road conditions without effecting the driving mechanism. This latter feature is best explained by comparison with other treads where the load is carried by the lower side of the tread. In such a case any irregular movement or bend of the tread on the roadside makes the track irregular with the result that the load carrying parts operating on the track are subjected to very severe strains and in many cases break or collapse due to the strain.

While I have described my invention in detail, still I wish it to be understood that the various parts could be readily changed from a mechanical standpoint without in the least departing from the spirit of the invention as set forth in the accompanying claims.

What I claim as my invention is:—

1. In combination, a continuous traction tread formed from similar tread sections pivotally connected together and presenting vertical and horizontal tracks, compression springs associated with adjacent tread sections, a load suspended from the upper side of the tread and riding one of the tracks and a drive for the tread engaging the other of the tracks.

2. A continuous traction tread formed from a plurality of connected and relatively movable sections presenting a flat load supporting surface at the side of the tread remote from the roadway.

3. In combination, a continuous traction tread presenting vertical and horizontal tracks, a load suspended from the upper side of the tread and riding one of said tracks, and a drive for the tread engaging the other tracks.

4. A continuous traction tread formed from similar pivotally connected track sections and compression springs associated with the adjacent ends of the track sections.

5. A continuous traction tread formed from similar track sections pivotally connected together and presenting end legs and tread faces extending between the legs and compression springs associated with the adjacent legs of the several tread sections and normally tending to close the legs together.

6. A continuous traction tread comprising a plurality of similar tread sections pivotally connected together and provided each with outwardly extending end legs and a tread face connecting the legs and having vertical and horizontal track sections secured to the sides thereof, and compression springs associated with the adjacent legs of adjoining tread sections and designed to normally close the legs together.

7. A continuous traction tread comprising a plurality of similar tread sections pivotally connected together and provided each with outwardly extending end legs and a tread face connecting the legs and having vertical and horizontal track sections secured to the sides thereof, headed bolts extending loosely through the adjacent legs of adjoining tread sections and compression springs on the ends of the bolts between the heads thereof and the legs.

8. The combination with a driving axle, of a continuous traction tread surrounding the axle and formed from a plurality of pivotally connected similar tread sections, each section presenting a vertical and a horizontal track section, compression springs normally pressing the adjacent ends of the tread sections together, hangers suspending the axle from the horizontal track sections and having their upper ends riding said track sections, driving wheels riding the vertical track sections and a driving connection between the axle and the driving wheels.

9. The combination with a driving axle, of a continuous traction tread surrounding the axle and formed from a plurality of pivotally connected similar tread sections, each section presenting a vertical and a horizontal track section, compression springs normally pressing the adjacent ends of the tread sections together, a pair of inner and outer hangers suspending the axle from the horizontal track sections, the said hangers being provided at their upper ends with carriage wheels riding the horizontal track sections, vertically disposed driving spindles carried by the hangers, a driving connection between the axle and the inner ends of the spindles and driving wheels secured to the upper ends of the spindles and frictionally engaging the vertical track sections of the track.

10. The combination with a driving axle, of a continuous traction tread surrounding the axle and formed from a plurality of pivotally connected similar tread sections, each section presenting a vertical and a horizontal track section, compression springs normally pressing the adjacent ends of the tread sections together, a pair of inner and outer hangers suspending the axle from the horizontal track sections, the said hangers being provided at their upper ends with carriage wheels riding the horizontal track sections, vertically disposed driving spindles carried by the hangers, a driving connection between the axle and the inner ends of the spindles, driving wheels secured to the upper ends of the spindles and frictionally engaging the vertical track sections of the track, inner and outer blocks formed as part of the hangers, inner and outer guides slidably receiving the blocks, cushioning springs positioned at the under side of the blocks and extension arms extending from the guides to the tread and provided at their extremities with rollers riding the inner side of the tread.

Signed at Winnipeg, this 19th day of June 1919.

HARVEY NELSON BINGHAM.

In the presence of—
G. S. ROXBURGH,
K. B. WAKEFIELD.